United States Patent [19]

Flock et al.

[11] 4,408,040

[45] Oct. 4, 1983

[54] SLURRY GRANULATION-STEAM STRIPPING PROCESS FOR SOLVENT REMOVAL

[75] Inventors: John W. Flock; Stephen L. Matson, both of Schenectady, N.Y.

[73] Assignee: General Electric Company, Schenectady, N.Y.

[21] Appl. No.: 351,380

[22] Filed: Feb. 23, 1982

Related U.S. Application Data

[63] Continuation-in-part of Ser. No. 262,738, May 12, 1981, abandoned.

[51] Int. Cl.[3] ........................ C08G 63/74; C08G 63/72

[52] U.S. Cl. .................................... 528/500; 528/502; 528/503

[58] Field of Search ................................ 528/500, 502

[56] References Cited

U.S. PATENT DOCUMENTS

| | | | |
|---|---|---|---|
| 2,959,561 | 11/1960 | Kelley | 528/500 |
| 3,189,080 | 6/1965 | Overcashier | 528/500 |
| 3,264,263 | 8/1966 | Baker | 528/498 |
| 3,527,741 | 9/1970 | Hattori | 528/500 |
| 3,583,967 | 6/1971 | Hattori | 528/500 |
| 3,772,262 | 11/1973 | Clementi | 528/500 |
| 4,212,967 | 7/1980 | Govoni | 528/500 |

*Primary Examiner*—C. A. Henderson

*Attorney, Agent, or Firm*—William H. Pittman; James C. Davis, Jr.; James Magee, Jr.

[57] ABSTRACT

An improved process for the continuous recovery of solid thermoplastic resin from organic solvent solutions using a modified slurry granulation-steam stripping process.

17 Claims, 1 Drawing Figure

SOLVENT RECOVERY 4 23 31 36 1 9 33 34 PREHEATER 38 37 8 12 29 10 GAS-SOLIDS SEPARATOR 28 STEAM 2 3 GRANULES 10 30 21 POLYMER SOLUTION 22 27 26 32 5 35 STEAM 11 24 6 7 SLURRY SIZE MODIFICATION DEWATERING 25

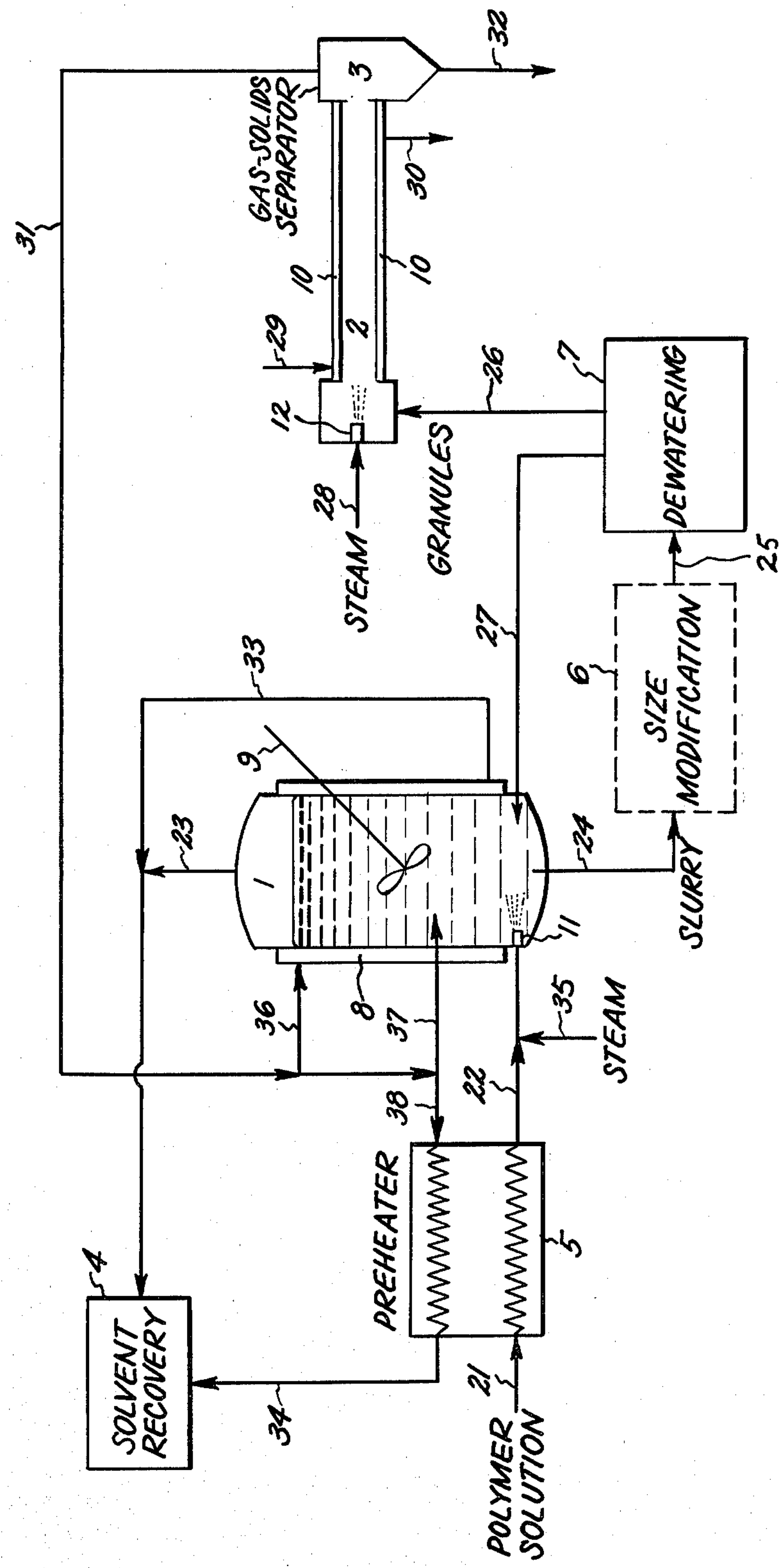
GAS-SOLIDS SEPARATOR
STEAM
GRANULES
DEWATERING
SIZE MODIFICATION
SLURRY
STEAM
PREHEATER
SOLVENT RECOVERY
POLYMER SOLUTION

SLURRY GRANULATION-STEAM STRIPPING PROCESS FOR SOLVENT REMOVAL

CROSS-REFERENCE TO RELATED APPLICATION

This application is a continuation-in-part to application Ser. No. 262,738 filed May 12, 1981, now abandoned, and assigned to the same assignee as the present invention.

This application is related to copending application Ser. No. 351,381, filed Feb. 23, 1982, entitled Process for Recovery of Solid Thermoplastic Resins From Solutions Thereof in Organic Solvents which is incorporated herein by reference.

BACKGROUND OF THE INVENTION

1. Field of the Invention

This invention relates to a method for removing solvent from a thermoplastic resin. More particularly to a continuous process for recovering a thermoplastic resin from a solution of said resin in a solvent comprising introducing said solution into a first vessel through atomizing means along with steam; removing solvent vapor and water vapor overhead resulting in a bottom product water slurry of polymer-solvent granules maintained at about 1 to 50 weight percent solids with makeup hot water; removing said bottom product slurry from said first vessel, removing hot water from said slurry, resulting in polymer granules with absorbed solvent and water; introducing said granules along with superheated steam into a second vessel wherein remaining solvent and water are volatilized from said granules while being carried through said second vessel by said superheated steam; separating polymer granules from the steam-solvent vapor mixture using separating means; recycling said steam-solvent vapor mixture for injection to the first vessel, for steam jacket heating of the first vessel or for preheating the polymer solution before injection into the first vessel; and recovering granular polymer product from said separating means.

2. Description of the Prior Art

One of the methods suggested in the past for the separation of polycarbonates and in general of polymers from their solution in organic solvents is removing solvent by feeding a concentrated solution of polycarbonate resin into one or more heated apparatuses, in particular into an extruder comprising degassing zones under vacuum for volatilizing the solvents. Said method involves rather high operation costs and high capital investment for the special equipment required.

Another method for the above process is disclosed in U.S. Pat. No. 3,772,262 which uses a "spray drying" technique, consisting of atomizing the solution of polymer-organic solvent in a stream of hot inert gas or gases, so as to facilitate the removal of the solvent. Such methods require the use of equipment having a low specific productivity and the use of large volumes of heated gases e.g., steam, which because of its high solvent content, cannot be effectively reused in other spray drying stages. In addition, only a small amount of recoverable energy contained in said steam can be recycled for preheating the solvent-polymer solution feed before the temperature of the solution approaches the condensing temperature of the steam-solvent mixture. This method also produces a solid polymer product with a low apparent density.

In addition, previous patents such as U.S. Pat. Nos. 3,031,438, 3,684,783 and 3,590,026 disclose methods, termed slurry granulation methods, wherein a polymer-hot organic solvent solution is dispersed in water and the solvent is removed or stripped in one or more stages of slurry granulation wherein steam heats the dispersion to supply latent heat of evaporation and also carries away solvent vapor. Multiple stage slurry granulation methods generally utilize higher temperatures in subsequent stages for increased solvent removal. The drawbacks of these methods are high consumption of energy, due to the necessity of using multiple stages in order to achieve a substantial removal of the solvent and above all, the fact that the product contains considerable quantities of water which must subsequently be removed by means of long and expensive drying processes wherein all of the energy in this large volume of relatively low temperature steam can not be utilized since only a limited amount of energy can be recovered in recycling for use in preheating the solvent-polymer solution or for heating the slurry since the high low-boiling solvent content of the steam mixture and its relatively low temperature render it unsuitable for use elsewhere in the process, e.g. steam stripping in earlier stages. Also, the low boiling, relatively non-condensable solvent vapor insulates heat exchanger surfaces from the high boiling steam. A common disadvantage inherent in the prior art is the lack of adequate heat or energy recovery or heat recycling capabilities at a time of high energy costs.

SUMMARY OF THE INVENTION

An object of this invention is to provide a new and improved continuous process for recovering polymers from organic solutions which does not have the drawbacks and disadvantages of the methods of prior art.

Another object is to provide methods by which the solvent is removed with low consumption of energy thereby achieving a very high productivity in equipment of very limited dimensions.

Another object of this invention is the obtaining of solid polymer of a high apparent density, substantially free of organic solvents and with a low moisture content.

Another object of this invention is the obtaining of polymer particles or granules having a controlled morphology and a controlled granulometry, e.g. the absence of skins on surfaces, optimum size, optimum pore volume (void fraction) and optimum pore size.

A further object of this invention is to obtain a solid polymer which may be used directly in extrusion equipment.

These and other objects are accomplished by a process for the separation of a solvent from a solvent-polymer solution producing particles with low solvent and water concentrations utilizing a modified slurry granulation-steam stripping process. This separation is achieved by means of a continuous process comprising the following steps:

(a) introducing a polymer-solvent solution to a first vessel by means of suitable atomizing means e.g. a nozzle, and applying heat to said first vessel by the introduction of steam and hot recycle water as is hereinafter described, (b) removing a mixture of solvent vapor and water vapor as an overhead product from said first vessel, condensing said overhead product and passing the condensate to a solvent recovery apparatus for further treatment, (c) removing a bottom product comprising a water slurry of resin granules containing absorbed solvent and water from said first vessel and passing said bottom product after optional size modification to a dewatering stage where most of the hot water is removed from said bottom product slurry for recycling as makeup water and for heating purposes in said first vessel, (d) passing said granules from said dewatering stage along with high temperature steam into said second vessel wherein remaining absorbed solvent and water are volatilized from said granules while being carried through said second vessel, (e) passing said granules along with the steam-solvent vapor mixture from said second vessel into a separation means, (f) recovering said steam-solvent vapor mixture for recycling to said first vessel for recovery of its heating value, for steam stripping and for possible preheating of the solvent-polymer feed solution entering said first vessel, and, (g) recovering said polymer granules from said separation means.

DESCRIPTION OF THE INVENTION

An important feature of the present invention is the use of atomizing means for the introduction of the polymer solution into the first separation vessel. A polymer solution can be atomized into small particles by passing through, for example, a nozzle. Smaller particles have higher surface area to volume ratio which provides for rapid evaporation of volitiles from the particles and also provides more rapid diffusion of the solvent to the surface of the particle because of its small size. An additional advantage of small particles in the first separation stage is an improved morphology in the resulting dried polymer.

The resin solvent feed mixture is introduced to the first separation vessel with steam if desired, by means of atomizing means, for example, a nozzle or nozzles, located internally and below the surface of the aqueous solution contained therein, which solution is stirred by means of a motordriven agitator or impeller located within the first separation vessel. The reason for having the nozzle below the water surface is threefold. First, by allowing the thermoplastic resin solvent mixture to be injected below the surface, particles of defined size are realized which enhances the solvent removal in subsequent stages. Secondly, the nozzle system thus contained within the first separation vessel allows for a more uniform dispersion of the resinous particulate material through the water slurry in the vessel without the requirement for an excess of steam for mechanical transport of the particulate thermoplastic resin material and thirdly, the morphology, i.e., the porosity and pore size distribution of the resulting particulate resinous material is subject to greater control which further promotes solvent removal by increasing diffusion of the solvent to the surface of the particles. In addition to the above stated advantages, the nozzle assembly incorporated into the system allows for the formation of particulate material eliminating the requirement for a dispersing agent as taught in U.S. Pat. No. 3,590,026 which dispersing agent may be retained as a contaminant in the final polymeric material.

The polymer particle size produced by the nozzle is extremely important. Smaller particles provide more contact with the steam, better flashing of the solvent from the particles and also a better particle morphology in the polymer product. Agglomeration of the particles may take place in the separation vessel even with short residence times, however, the agglomerates of the present process are composed of small particles and are porous allowing rapid solvent diffusion even from the agglomerates.

Prior art methods provided slow, low pressure polymer solution feed to the first separation vessel producing very large particles or strings of solution which were subsequently broken into smaller particles by impeller agitation. In a preferred embodiment of the present invention the polymer feed solution is passed through a nozzle under high pressure which produces solvent flashing, small primary particles and porous secondary agglomerate granules. Agitation can supplement the nozzle in dispersing the particles.

According to the present process there may be conveniently used solutions having concentrations of thermoplastic resin of up to approximately 50% by weight.

Solutions with a low concentration of thermoplastic resins, such as polycarbonate resins of high molecular weight such as are directly obtained according to known synthesis processes carried out in the presence of a solvent, are particularly suitable for use in the practice of this invention.

Exemplary of such solutions are the solutions obtained by interfacial polycondensations of phosgene and bisphenol-A, preferably using methylene chloride as solvent and in general containing up to 20%, by weight, of polycarbonate resin.

Among such polymeric compositions which may be treated according to the process of the present invention are polyester resins, for example, polyethylene terephthalate, polybutylene terephthalate, etc.; polyimide resins, polyurethane resins, polyphenylene oxide resins as are more particularly disclosed and claimed in U.S. Pat. No. 3,306,875, issued Feb. 28, 1967, etc.

Examples of solvents which may be extracted or removed from thermoplastic resins according to the novel process disclosed herein are, chlorinated and brominated hydrocarbons having from one to two carbon atoms, e.g., methylene chloride, 1,1,2,2-tetrachloroethane, 1,2-dichloroethylene, chloroform, 1,1,2-trichloroethane aliphatic and aromatic hydrocarbon solvents such as benzene, heptane, xylene, toluene, mesilytene, etc.

It is also possible to treat, according to the process of the present invention thermoplastic resin solutions, for example, polycarbonate solutions, containing, in a dispersion, mineral fillers and/or inorganic pigments such as, for instance, glass fibers, asbestos, mica, and metal oxides. In this case, the powders, particles or granules of polymer thus obtained contain the above-mentioned fillers in a state of homogeneous dispersion, with the advantage that thereby subsidiary operations of homogenization before extrusion and pelletization are avoided.

The granular thermoplastic resin product obtained using the process of the present invention still contains traces of solvent and water which may optionally be removed in further drying steps.

By use of the process of the present invention optionally with additional drying stages, it is possible to obtain thermoplastic resin granules which may be directly fed into standard extrusion equipment for subsequent comminuting into pellets without encountering, for instance, phenomena of clogging or pulsing, thus achieving regularity in the running of extrusion equipment with a consequential increase in overall efficiency.

The process of the present invention involves the synthesis of a method termed slurry granulation and a higher temperature process similar to that used in existing resin plants, termed steam stripping or steam precipitation. In the slurry granulation step the thermoplastic resin or polymer solution is dispersed in hot water [e.g., from 45° to 120° C. and from 0.1 to 2 atmospheres pressure] by injection under pressure through a nozzle optionally with steam, and the majority of the solvent is removed from the slurry and the resulting suspended polymer granules by stripping with steam at a relatively low temperature, e.g. less than 120° C. The solid polymer granules from the first stage are then separated from the water and fed to a higher temperature steam stripping stage e.g., from 125° to 250° C. where steam carries the polymer granules down a long tube which may be insulated or steam jacketed and the remaining solvent and water absorbed in the polymer granules is removed. The second stage pressure can vary from 0.3 to 2 atmospheres.

Relative to existing multi-stage steam precipitation processes the modified process of this invention better utilizes the heating value of the steam used in the second stage by enabling the recycling of said steam to a lower temperature first stage. Relative to existing multi-stage slurry granulation processes the process of the present invention results in a granular resin product having a lower residual solvent and water level in a minimum of steps and is better able to fully utilize the heating value of the steam employed in the process. The higher temperature second stage in the process of the present invention favors rapid solvent volatilization while the lower temperature first stage makes possible the efficient use of most of the heating value of the steam consumed in the second stage. Recycled steam from the second stage may be used for reinjection as a stripping medium in the first stage, for heating the first stage vessel using a steam jacket, or for preheating the polymer solvent solution feed to the first stage. Energy is also conserved by recycling hot water removed in the dewatering stage back to the first vessel for heating the slurry as well as for makeup water necessary for proper particle formation in the granulation process.

In some cases it may be desirable to inject fresh steam into the first stage in order to have sufficient steam pressure to achieve adequate polymer solution dispersion from the first stage nozzle or nozzles, and for more efficient solvent stripping; however in any case the mixture of steam and solvent recovered overhead from the first stage vessel can be used to preheat the polymer feed solution before recovering the solvent. Although the low temperature first stage equilibration favors low steam consumption it also favors higher residual solvent in the range of between about 4 and 25% solvent, by weight, based on the total weight of the solvent and granules. The purpose of the second stage steam stripping is to remove this remaining solvent to meet product specifications which are typically less than 1% solvent by weight. As low levels of solvent are approached, the removal of solvent becomes limited by its rate of diffusion out of the resin phase and through any water which may be present in the pores of the granules. Since the distance that the solvent must diffuse is important in a rate-limited situation, the granules from the first stage can be milled to reduce their size prior to their introduction into the second steam stripping stage. This milling may also facilitate mechanical transport of the polymer granules through the second stage stripping tube by the rapidly moving high temperature steam. Particle size can be controlled to eliminate interstage milling by proper selection of nozzle type and size and by operating conditions in the first stage.

Complete water removal after the first stage is not required since it will be vaporized off in the second stage and the heat required for this vaporization will be recovered in the first stage or alternatively in preheating polymer feed solution. Milling prior to dewatering presumably would minimize the fusing of polymer particles containing a high-concentration of solvent and could reduce the amount of moisture remaining after dewatering; however, heat losses with this configuration would be somewhat higher than if the dewatering operation were to precede milling. The optimum configuration will depend upon the operating conditions of the first stage as well as the particular polymer and solvent present in the in the feed solution.

The resin granules are stripped with steam in the second stage to decrease the residual solvent content to the desired levels and to remove residual water. In addition to providing the latent heat of evaporation of these volatiles, the steam added to the second stage also supplies the energy required to heat the materials to the operating temperature of the second stage which is higher than that of the first stage. The vapor stream exiting the second stage stripping vessel is composed mainly of steam and is capable of supplying most if not all of the heat required for heating the first stage vessel and the solvent-polymer feed depending on the temperatures of the stages. The condensate and noncondensables from the first stage heat exchangers are sent to solvent recovery means.

The size of the first stage vessel is determined by the rate of polymer solution feed, the desired first stage vessel residence time and the desired solids concentration in the slurry which consequently determines granule size and morphology. The size and shape of the second stage vessel is determined by the rates of evaporation of water from the granules (heat transfer limited) and of diffusion of the solvent from the resin granules. A preferred second stage vessel would be a horizontal cylindrical vessel, e.g. a pipe with a length sufficient to result in the required residence time, at the operating velocity of the steam in the vessel, which will result in adequate equilibration of the polymer particles, water and solvent with the steam. The second stage vessel may be insulated or heat jacketed to prevent condensation during the second stage stripping process or to promote evaporation of the solvent into the steam carrier gas.

DESCRIPTION OF THE DRAWING

The present invention, can be carried out in an apparatus as shown in the accompanying FIGURE. A solution of a thermoplastic resin and a volatile organic diluent from a polymerization reactor (not shown), such as a solution of 18%, by weight, polycarbonate in methylene chloride, is passed via line 21 through preheater 5, which is heated by recycled steam and solvent vapor, then via line 22 and nozzle 11 to a first vessel 1 for slurry granulation and steam stripping. This first vessel 1 is optionally equipped with mixing means 9, e.g. a propeller agitator driven by motor means to keep the polymer suspended as a slurry in the hot water. The volatilized organic diluent is removed overhead from vessel 1 via line 23 and is transferred via line 33 to solvent recovery means 4. The hot aqueous slurry of polymer granules is withdrawn via line 24 and after passing through an optional stage of size modification 6, passes via line 25 to dewatering or liquid-solids separation means 7, such as by centrifugation, filtration, screening, and the like. The separated hot water is removed via line 27 and recycled to the first stage to be used as makeup water and for additional heating of the slurry in vessel 1. Separated polymer granules are transferred via line 26 to a second vessel 2 for steam stripping. High temperature superheated steam for drying the polymer granules and for moving said granules through the second vessel 2 is supplied via line 28 and introduced, e.g. through nozzle 12. The second vessel is alternatively insulated, or heated by a steam jacket 10 which is supplied with steam via line 29 and drained of condensate solvent vapor then enters gas-solids separation means 3, e.g. a cyclone separator. Steam and solvent vapor is removed from said gas-solids separator 3 via line 31 to be recycled on one or more of the following means; to the polymer feed preheater 5 and then via line 34 to solvent recovery means 4, to first vessel 1 via line 37 for heating the slurry and for steam stripping purposes, or via line 36 to the first vessel steam jacket 8 then via line 33 to solvent recovery means 4. Dried polymer granules from gas-solids separation means 3 are removed via line 32 for further drying, if necessary, storage or extrusion.

In order that those skilled in the art may readily understand the invention, the following example is given by way of illustration and not by way of limitation.

EXAMPLE

The process of the present invention may be better understood by reference to the following description of a specific embodiment as applied to the accompanying drawings. A mixture of 18% by weight of polycarbonate in methylene chloride is passed through preheater 5 along with steam via lines 22 to the first vessel 1 containing water at about 70° C. for granulation and steam stripping. The pressure in the first vessel 1 is maintained near atmospheric pressure. Mixed vapors of steam and methylene chloride are passed via line 23 to a methylene chloride condenser for solvent recovery. A slurry of 5% by weight polycarbonate granules in water is removed from the first vessel 1 via line 24 and passed to a centrifugal dewatering stage 7 after which the polycarbonate granules substantially free of water are passed via line 26 to the second vessel 2 for steam stripping. Hot water from the centrifugal dewatering stage 7 is recycled via line 27 to the first vessel to supply heat for the devolatilization and as makeup water to maintain the slurry in the first vessel at about 5% by weight solids. Fresh superheated steam at about 200° C. is introduced along with the polycarbonate gradules from the dewatering stage 7 onto the second stage steam stripping tube 2, which is a steam jacketed pipe 75 meters long. The flow rate within said pipe is approximately 10–20 meters per second so that the polycarbonate particles are maintained in suspension. The total residence time of the dispersion in the steam stripping tube 2 amounts to about 5 seconds.

At the outflow from the steam stripping tube the solid-gas dispersion flows into a cyclone separator 3 where the steam and methylene chloride vapors separate at a temperature of about 120° C. from the polycarbonate which gathers at the base of the cyclone in the form of solid granules having a water content of about 5% by weight and a residual content of methylene chloride of about 1% by weight.

The polycarbonate particles separated at the base of the cyclone can then optionally be conveyed to an additional drying stage e.g. a fluid bed dryer and then stored or extruded via conventional means.

Other modifications and variations of the present invention are possible in light of the above teachings. It is, therefore, to be understood that changes may be made and particular embodiments described which are within the full intended scope of the invention as defined in the appended claims.

What is claimed is:

1. A continuous process for recovering a thermoplastic polycarbonate or polyphenylene oxide resin from a solution of said resin in a solvent comprising introducing said solution into a first vessel through atomizing means along with steam, below the surface of the liquid contained in said first vessel; removing solvent vapor and water vapor overhead resulting in a bottom product water slurry of polymer-solvent granules maintained at about 1 to 50 weight percent solids with makeup hot water; removing said bottom product slurry from said first vessel; removing hot water from said slurry, resulting in polymer granules with absorbed solvent and water introducing said granules along with superheated steam into a second vessel wherein remaining solvent and water are volatilized from said granules while being carried through said second vessel by said superheated steam; separating polymer granules from the steam-solvent vapor mixture using separating means; recycling said steam-solvent vapor mixture for injection to the first vessel for steam jacket heating of the first vessel or for preheating the polymer solution before injection into the first vessel; and recovery granular polymer product from said separating means.

2. The process of claim 1 wherein polymer granules are reduced in size after recovery from said first vessel and before introduction into said second vessel.

3. The process of claim 1 wherein the contents of the first vessel are mechanically agitated during operation.

4. The process of claim 1 wherein the temperature of the first vessel is less than 120° C.

5. The process of claim 1 wherein the second vessel is maintained at between 125° C. and 250° C.

6. The process of claim 1 wherein steam and polymer solution are introduced independently through multiple nozzles.

7. The process of claim 1 wherein the first vessel is maintained at between about 0.1 and 2.0 atmospheres pressure.

8. The process of claim 1 wherein the second vessel is maintained at between 0.3 and 2.0 atmospheres pressure.

9. The process of claim 1 wherein the thermoplastic resin is polycarbonate.

10. The process of claim 1 wherein the solvent is methylene chloride.

11. The process of claim 1 wherein the thermoplastic resin is polyphenylene oxide.

12. The process of claim 1 wherein the solvent is toluene.

13. The process of claim 1 wherein the thermoplastic resin solution contains up to about 50 percent by weight resin.

14. The process of claim 1 wherein the second vessel is heated by a steam jacket.

15. The process of claim 1 wherein the first vessel is heated by a steam jacket using recycled steam from said second vessel.

16. The process of claim 1 wherein the polymer granules are milled to reduce their size between the first and second stages.

17. A continuous process for recovering polycarbonate resin from a solution of said resin in methylene chloride comprising the following steps:

(a) introducing the polycarbonate-methylene chloride solution into a vessel, below the surface of the liquid contained therein, by means of a nozzle to form a dispersion of said solution in water maintained at about 70° C.;

(b) removing a mixture of methylene chloride vapor and water vapor as an overhead product from said first vessel, passing said overhead product through a heat exchanger for preheating polycarbonate solution feed and finally passing said overhead product to a methylene chloride recovery apparatus;

(c) recovering a bottom product from said first vessel comprising a water slurry of polycarbonate granules containing absorbed methylene chloride and water and passing said bottom product to a centrifugal dewatering stage where hot water is removed for recycling as makeup water and for heating purposes in said first vessel;

(d) passing said polycarbonate granules along with superheated steam at 200° C. into a second vessel wherein remaining absorbed methylene chloride and water are volatilized from said polycarbonate granules while being carried through said second vessel;

(e) passing said polycarbonate granules along with the steam-methylene chloride vapor mixture from said second vessel into a cyclone separator;

(f) recovering said steam-methylene chloride vapor mixture for recycling to said first vessel for recovery of its heating value for steam stripping and for possible preheating of the polycarbonate feed solution entering said first vessel; and (g) recovering said polycarbonate granules from said cyclone separator.

* * * * *